LOCKE & ULRICH.
Gas Burner.
No. 3,650. Reissued Sept. 28, 1869.
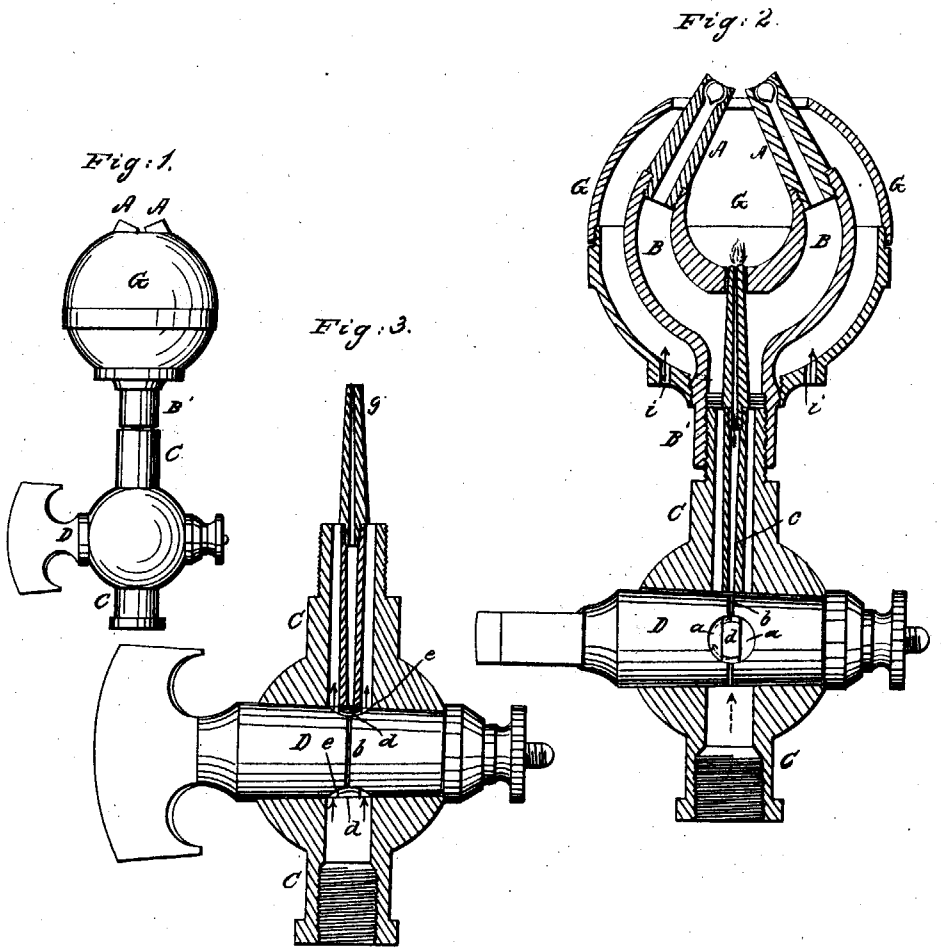
Witnesses
R. F. Campbell
Edw Schafer.
Inventors:
Rich B Locke
Wm B. Ulrich.
N. PETERS, Photo-Lithographer, Washington, D. C.

The drawing in this patent is not in print.

UNITED STATES PATENT OFFICE.

BENJAMIN COLLINS, OF NEW YORK, N. Y., ASSIGNEE, BY MESNE ASSIGNMENTS, OF R. B. LOCKE AND WILLIAM B. ULRICH.

IMPROVEMENT IN GAS-BURNERS.

Specification forming part of Letters Patent No. 63,802, dated April 16, 1867; Reissue No. 3,650, dated September 28, 1869.

*To all whom it may concern:*

Be it known that the following is a full, clear, and exact description of an Improved Gas-Burner invented by RICHARD B. LOCKE, of New Orleans, and WILLIAM B. ULRICH, of Concordia Parish, in the State of Louisiana, reference being had to the accompanying drawings, making a part of this specification, in which—

Figure 1 is a side elevation of an improved burner complete and ready for use. Fig. 2 is an enlarged diametrical section through the improved burner, showing the cock turned so as to cut off the supply of gas to the primary burner or tips. Fig. 3 is a diametrical section with the globular chamber and primary burner removed, showing the cock turned so as to allow a full flow of gas to the primary burner or tips.

Similar letters indicate corresponding parts in the several figures.

The object of this invention is to provide for the retention, during the time that it is not required to use a gas-burner for illumination, of a small flame by which the gas when turned on in sufficient quantity for illumination may be ignited.

The invention consists, first, in a novel construction of a cock to be applied in connection with the burner for this purpose.

To enable others skilled in the art to understand the invention, the following is given as a description of its construction and operation, under one form or mode of applying it at least.

In the accompanying drawings, Figs. 1 and 2, the invention is represented as applied to the well-known form of gas-burner, which will here be termed the "primary burner," consisting of two burners or tips, A A, inclined toward each other and screwed into curved branches B B, so that the two jets of gas issuing from the orifices of the tips will impinge upon each other and present a broad and beautiful flame. These branches B B terminate at their lower ends in a central tube, B′, which is screwed on the end of the gas-pipe C, as shown in Figs. 2 and 3. At a short distance below the tips A A, a cock, D, is applied to the pipe C and fitted gas-tight, so as to allow of the gas being shut off from these tips or turned on at pleasure. This cock D is constructed with an orifice, *a*, through it, through which the gas is allowed to escape freely to the tips A A when this cock is turned, as shown in Fig. 3. When the cock is turned with its orifice *a* at right angles to the pipe C, as in Fig. 2, the gas will be cut off from the tips A A, but will be allowed to flow in small quantities through the fine annular grooves *b*, which are made in the circumference of the cock in a plane intersecting the axis of the orifice *a*, as shown in Figs. 2 and 3, from which grooves the gas is conducted through a small pipe, *c*, to the secondary burner or tip, *g*, as will be presently described.

A division-piece, *d*, is secured in the center of the orifice *a*, so as to leave narrow spaces *e e* at its extremities for the purpose of allowing gas to rush suddenly through the small pipe C to the tip *g*, just before the full flow or head of gas is turned on to the tips A A. Those ends of the divisional piece *d* which are between the spaces *e e* are designed to serve as valves for closing the lower end of the small pipe *c* when the orifice *a* is in line with the bore of the pipe C and the full flow of gas is admitted to the tips A A. When said pipe *c* is closed, the small blue flame of the tip *g* will be extinguished. The upper end of the taper or tip *g* is passed gas-tight through a hole which is drilled through the crotch of the branch pipes B B, so that the fine orifice of this tip will be in a vertical plane beneath the converging ends of the tips A A and sufficiently near these ends to allow of the communication of flame to the gas issuing therefrom by the flame of the tips A A.

The small pipe *c* is secured in the center of the larger gas-pipe C in such manner that the gas rising through the orifice of cock D will not be materially obstructed in its passage to the tips A A.

The pipe C may be a short section of pipe of sufficient length to receive the cock D and internal gas-tube, *c*, and having a female screw-thread or coupling formed in its lower end so that it can be screwed on a gas-pipe in place of any of the old forms of burners.

At the base of the curved branches B B a male screw-thread is formed on the central tube, B′, upon which is screwed a hollow globe, hood, or shell, G, which incloses the tips A A below their upper ends, and forms an air-supply chamber for inducing currents of air to rise through the orifices *i i* at its base and impinge upon the flame.

The air which rises into the chamber G becomes heated and supplies more or less oxygen to the flame, whether such be the larger one used for illuminating purposes or the smaller one that is used for igniting. It also protects the small or igniting flame from being extinguished by strong currents of air, and should be made opaque, to conceal the same or prevent its being visible and having an illuminating action or effect, which is desirable it should not have.

The operation of the burner when constructed as described is very simple. The cock being turned so as to admit gas to the tips A A, this gas is lighted and burns in the usual manner. In the act of shutting off the gas from these tips by turning the cock D, and immediately before the full supply of gas is cut off, one of the spaces *e* is brought beneath the orifice through the tube *c*, which instantly causes the gas to jet from the tip *g* and take fire from the nearly-extinguished flame of the tips A A. Thus the tip *g* will be lighted in the act of cutting off the gas from and extinguishing the tips A A. When the space *e* passes the orifice of the tube *c*, the gas will be conducted to this tube through the fine groove *b* in the cock-plug, as before described, and burned with a small blue flame. In the act of turning on the gas to obtain light, one or the other of the spaces *e* at the ends of the division *d* and orifice *a* of the cock-plug will be again brought opposite the lower end of the small pipe *c*, leading to the lighted tip, thus allowing a full pressure of gas to this tip, which will cause its flame to jet upward a sufficient length to ignite the gas issuing slowly from the orifice of the tips A A. When the cock D is turned fully, the divisional piece *d* will cut off the escape of gas through the tube *c* and extinguish the taper or tip *g*. Thus the tip *g* will be extinguished in the act of admitting gas to and lighting the tips A A. It will thus be seen that the small taper is provided for the purpose of lighting the primary burner, or what may be termed the illuminating gas jet or stream issuing therefrom, and not for giving light. It is preferred to make this taper so that it shall consume but a trifling amount of gas when in use, and none at all when the tips A A are lighted.

The invention is here described as applied to converging burner tubes or tips as one practical mode of carrying it into effect, but it is not confined to this particular kind of gas-burner, and may be applied to other forms of tips by making slight changes in the construction of the parts herein shown, without, however, changing the principle of the invention as herein set forth.

It is obvious that the fine groove *b* which has here been described as being made in the cock-plug D may be made in the pipe C, and answer the purpose designed just as well.

What is here claimed, and desired to be secured by Letters Patent, is—

1. The divisional piece *d*, or its equivalent, applied to the orifice *a* of the grooved cock D, and constructed with gas-escapes *e e*, in combination with a self-lighting burner, substantially as described.

2. The hood or shell G for supplying oxygen to the burner and for the concealment and protection of the small flame, substantially as described.

BENJAMIN COLLINS.

Witnesses:
HENRY T. BROWN,
HENRY PALMER.